Feb. 5, 1952 L. W. WATERS 2,584,519
PEACH PITTING APPARATUS
Filed March 5, 1947 6 Sheets-Sheet 1

Fig. 1.

INVENTOR.
Laurence W. Waters
BY
Mellin & Hanscom
ATTORNEY.

Feb. 5, 1952     L. W. WATERS     2,584,519
PEACH PITTING APPARATUS Filed March 5, 1947     6 Sheets-Sheet 2

INVENTOR.
Laurence W. Waters
BY
Mellin & Hanscom
ATTORNEY.

Feb. 5, 1952 L. W. WATERS 2,584,519
PEACH PITTING APPARATUS
Filed March 5, 1947 6 Sheets-Sheet 3

Fig. 4.

INVENTOR.
Laurence W. Waters
BY
Mellin & Hanscom
ATTORNEY.

Feb. 5, 1952 L. W. WATERS 2,584,519
PEACH PITTING APPARATUS
Filed March 5, 1947 6 Sheets-Sheet 4

INVENTOR.
Lawrence W. Waters
BY
Mellin & Hanscom
ATTORNEY.

Patented Feb. 5, 1952

2,584,519

UNITED STATES PATENT OFFICE 2,584,519

PEACH PITTING APPARATUS

Laurence W. Waters, Ontario, Calif., assignor to Atlas Imperial Diesel Engine Co., Oakland, Calif., a corporation of Delaware Application March 5, 1947, Serial No. 732,391

5 Claims. (Cl. 146—28)

This invention relates generally to peach pitting machinery adapted for use in cannery operations for halving and separating peaches from their pits prior to canning and cooking the fruit.

More particularly, this invention relates to peach pitting apparatus of the type hereinabove referred to wherein the halving of the peach and the separating of the pit therefrom is accomplished by means of a pair of flexible severing wires under tension which are guidedly drawn through a peach on each side of and immediately adjacent to the pit of the peach, thus halving the fruit and separating the pit therefrom.

It should be noted that while the apparatus of this invention is primarily intended for use in halving and pitting peaches of the clingstone variety, it may also be used for halving and pitting various other types of drupaceous fruit, whether clingstone or freestone.

Prior art peach pitting apparatus of the flexible wire severing type have numerous disadvantages. Among these is the fact that multitudinous moving parts are employed in such prior art constructions and virtually all of said moving parts are so positioned relative to the peach pitting zone or the severing zone that fruit acid, pulp, and the like, tend to accumulate on and between said moving parts, thus rapidly leading to clogging of the moving parts and to corrosion. Such constructions require very frequent cleansing with live steam or other suitable cleansing agents in order to keep them in a condition capable of operation. Since a peach canning season is of but a few months' duration, it is essential that the peach pitting machinery be as foolproof as possible so that no unnecessary shut-downs will occur.

Another major disadvantage of such prior art constructions is the fact that the peach must be manually placed in position with respect to the fruit-holding assembly in an extremely awkward and dangerous position for the operator, since the peach and the operator's hand must be placed in alignment with an in the path of movement of the severing means in the severing zone. This awkward loading operation slows down the speed at which the operator may pit peaches and furthermore is dangerous to the operator, since a finger or other portion of the hand or arm may be caught in the moving parts of the machinery.

The peach pitter of this invention avoids the hereinbefore-mentioned disadvantages of the prior art constructions. The peach pitter of this invention is of vertical construction and the majority of moving parts are positioned above the peach pitting or severing zone and are not subjected to fruit pulp, acid, or the like and therefore do not tend to become clogged during operation. Corrosion is also minimized. The apparatus of this invention is of relatively open, accessible construction, making it possible to hose down, steam clean, or otherwise clean the entire apparatus very rapidly and simply. Generally speaking, the apparatus of this invention comprises a fruit holder movable between a fruit-loading zone and a severing zone and vertically reciprocable, flexing wire severing means cooperable with the fruit holder and arranged to move into and out of the severing zone for pitting the peach. The oscillating fruit holding assembly moves from an accessible fruit-loading position in a fruit loading zone, where the operator may very readily insert a peach therein, to a severing position in a fruit severing zone aligned with the flexible wire severing means. The before-mentioned loading position is completely out of alignment with and out of the path of movement of the other moving parts of the apparatus. Therefore there is no danger to the operator during the fruit-loading operation. Furthermore, such fruit-loading operation may be speeded up by reason of the accessibility of the fruit-holding assembly. Subsequent to the fruit-loading operation, the fruit-holding assembly moves into a severing zone in alignment with the severing means where flexible severing wires under tension are passed through the peach closely adjacent to and on each side of the pit, thus pitting the peach. This is an exceedingly desirable mode of operation, since it both protects the operator from damage and speeds up the fruit pitting operation.

With the above points in mind, it is an object of this invention to provide a new and improved vertical peach pitting apparatus of the type wherein the pitting is done by a pair of flexible severing wires under tension and where the majority of moving parts are positioned away from the peach pitting zone for minimizing clogging and corrosion of the apparatus.

Another object of the invention is to provide a new and improved vertical peach pitting apparatus including a movable fruit-holding assembly adapted to move between a fruit-loading position and a fruit-severing position in alignment with the severing means.

It is a furtder object of this invention to provide a new and improved peach pitting apparatus of relatively simple, rugged, foolproof, open, accessible construction, whereby the apparatus may be readily cleaned and maintained so.

Other and allied objects will become apparent to those skilled in the art from a careful examination and perusal of the illustration, specification and appended claims. To facilitate understanding, reference will be had to the following drawings, in which:

The structure of this apparatus will first be described generally. A more specific description will follow later.

Figure 1:
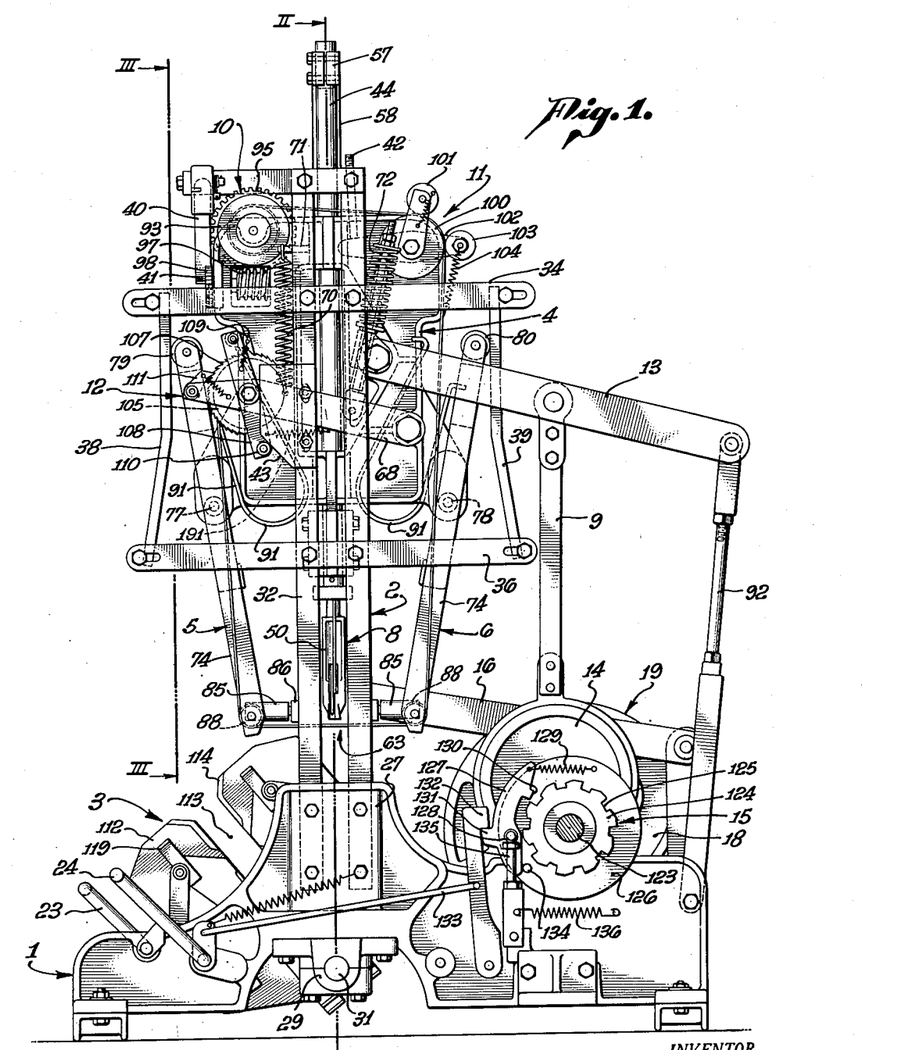
Fig. 1 is a right side elevational view of one embodiment of this invention with the driving means which may include reduction gearing and the like, not shown.
Figure 2:
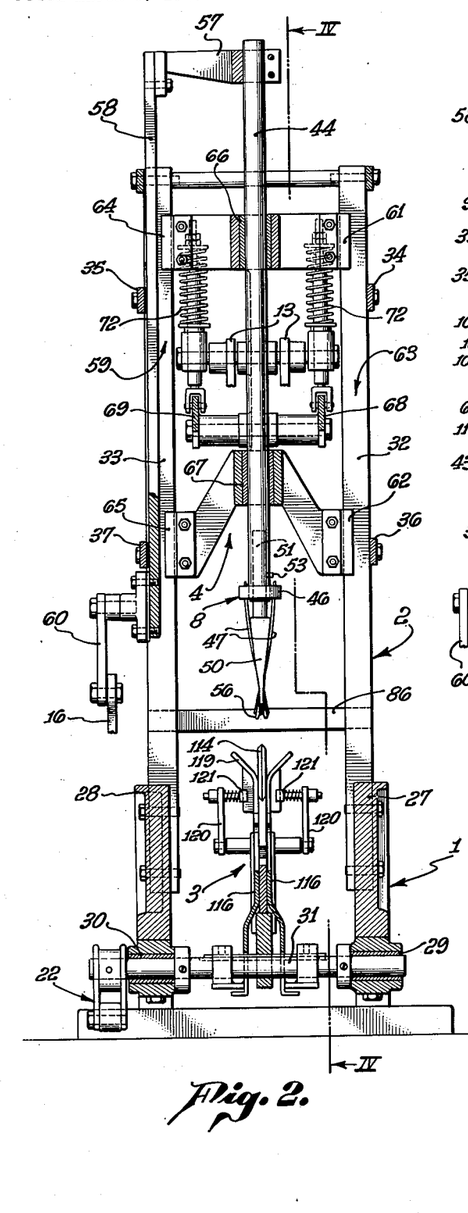
Fig. 2 is a sectional view taken along II—II of Fig. 1.
Figure 4:
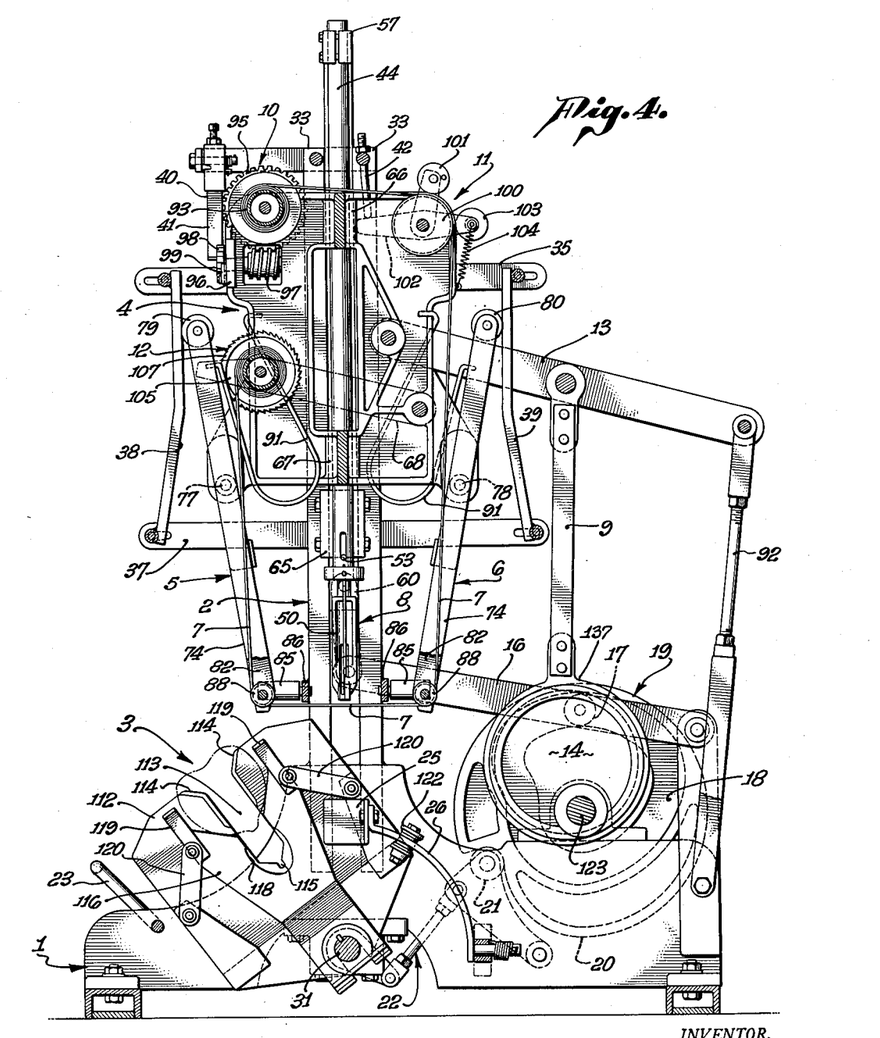
Fig. 4 is a sectional view taken along IV—IV of Fig. 2.

A base, indicated generally at 1, has vertically mounted thereon a frame, indicated generally at 2, and a fruit holder or incisor assembly, generally indicated at 3, pivotally mounted at the bottom of the frame adjacent the junction of the frame 2 and the base 1. Vertically reciprocably mounted with respect to the frame 2 is a movable carriage indicated generally at 4. Said carriage 4 is provided with two pairs of pivotally mounted lever arms 5 and 6 which carry a pair of flexible severing wires 7 adapted to be vertically reciprocated into the peach severing zone. A pit-locating assembly, indicated generally at 8 is vertically reciprocably mounted with respect to the frame 2. Wire feeding means, indicated generally at 10, is adapted to feed a predetermined amount of severing wire during each operating cycle through snubbing means, indicated generally at 11, to the severing zone between the ends of the levers 5 and 6. Wire take-up means, indicated generally at 12, is adapted to take up the flexible severing wires 7 in an amount determined by the tension of the severing wires and in response to upward movement thereof. The carriage 4 is operatively connected by a lever 13 and connecting arm 9 to an eccentric 14 adapted to be driven by a one-revolution clutch indicated generally at 15 which, in turn, may be driven by reduction gearing and motor (not shown). The vertically reciprocable pit-locating assembly indicated generally at 8, is operatively connected to a lever 16 which is provided with a cam follower 17 adapted to fit into a cam track 18 of a cam indicated generally at 19 which is also driven by the one-revolution clutch 15. The exterior of the cam 19 has a cam surface 20 which cooperates with a cam follower 21 for pivotally moving the fruit holding or incisor assembly 3 by means of a linkage 22, between the loading position as shown in Figs. 1 and 4, into the severing position shown in Fig. 5.

The operation of the device may be described generally as follows. A peach is manually impaled in the fruit holding or incisor assembly, as shown in Figs. 1 and 4, with the stem end of the peach up, tip of the peach down, and the suture or seam of the peach parallel to the plane of the incisor assembly. Safety handle 23 is then manually released so that a controlling handle 24 may be actuated. This causes the engagement of the one-revolution clutch 15 and causes same to drive the eccentric 14 and cam 19 simultaneously through one revolution in a clockwise direction. The first result of the simultaneous revolution of the eccentric 14 and the cam 19 is the movement of the fruit holding or incisor assembly 3 by means of the cam follower 21 engaging the cam surface 20 through the linkage 22 into the vertical fruit-severing position in alignment with the severing means, best shown in Fig. 5. Next in the sequence of operations, the carriage 4 is caused to move upward slightly by means of the lever 13, connecting rod 9, and eccentric 14. This causes the severing wire feeding means, indicated generally at 10, to rotate in a clockwise direction, as viewed in Fig. 1, and advances a predetermined amount of wire toward the severing zone. The exact manner in which this operation takes place will be described more particularly hereinafter.

Immediately thereafter, the wire snubbing means indicated generally at 11, which up to this time have been tightly in contact with the severing wires, are released from such contact. The exact way in which this occurs will be described more particularly hereinafter. This allows the opposite ends of the severing wires to be taken up by the take-up means indicated generally at 12 provided that the tension in said wires is less than a predetermined value. Means used in this operation will be described more fully hereinafter.

Next in the sequence of operations, the pit-locating assembly, indicated generally at 8, is moved downwardly by the lever 16 and cam follower 17 which is engaged in the cam track 18. Next the eccentric 14, through connecting arm 9 and lever arm 13, starts to move the carriage 4 downwardly. The pit-locating assembly 8 moves downward more rapidly than the carriage 4 and passes between the spaced, parallel flexible severing wires 7 which are fairly widely separated from each other at this time. The pit-locating assembly 8 then continues on down until it engages the stem end of the peach firmly. The pit of the peach is thus located between the pit-locating assembly at the top and the bottom of the fruit holding or incisor assembly 3. At this time the downward movement of the carriage 4, carrying the lever arms 5 and 6 and severing wires 7, speeds up and the flexible severing wires cooperate with the incisor assembly 3 and are guided through the fleshy portion of the peach on each side of and in close relation to the pit of the peach. At the conclusion of the downward movement of the carriage 4, the flexible severing wires 7 have passed completely through the peach.

Next in the sequence of operations, the eccentric 14 causes the carriage 4 and the arms 5 and 6 and flexible severing wires 7 to be rapidly moved upward back through the incisor assembly 3 toward the position shown in Fig. 1. During the passage of said severing wires back through the incisor assembly 3, the pit of the peach is ejected from the severing zone by means of the flexible severing wires 7. Next in the sequence of operations, the pit-locating assembly 8 is caused to move upward to its forward position by the cam follower 17 and cam track 18 of the cam 19. The cam follower 21 on the outer cam surface 20 of the cam 19 through linkage 22 causes the incisor assembly 3 to move back to its former angular fruit-loading position, as shown in Figs. 1 and 4. It should be noted that in the example shown, a fruit presser plate 25 provided with a cam surface 26 is pivotally mounted on the base 1 and is spring-biased so that it will engage one surface of a peach held in the incisor assembly 3 when the incisor assembly 3 is in vertical severing position. The cam surface 26 cooperating with a roller 122 on the incisor assembly 3 will cause the pressure plate 25 to be forced away from the incisor assembly 3 when said incisor assembly is moved back to fruit-loading position.

The structure will now be described more specifically.

Framework

Mounted upon the base 1 are two, spaced, upstanding portions 27 and 28. Horizontally passing through bearings 29 and 30 in the lower portion of the two upstanding portions 27 and 28 is shaft or pivot 31. Mounted upon the shaft or pivot 31 in the center thereof and between the two upstanding portions 27 and 28 of the base 1 is the fruit holding or incisor assembly 3, the structure of which will be described more particularly hereinafter.

Fixedly attached to the upstanding portions 27 and 28 of the base 1 by suitable fastening means, such as bolts or the like, is the frame, indicated generally at 2. The frame 2 comprises upstanding, spaced standards 32 and 33. Attached to standards 32 and 33 are two, spaced, parallel, transverse, upper cross bars 34 and 35 and two, spaced, parallel, lower cross bars 36 and 37. Vertically mounted between the front ends of the upper parallel cross bars 34 and 35 is the upper end of a cam or cam track 38, the lower end of which is mounted between the front ends of the lower spaced parallel cross bars 36 and 37. Similarly, a cam or cam track 39 is mounted between opposite or rear ends of the cross bars 34, 35 and 36, 37 on the opposite side or rear of the apparatus. The cams or cam tracks 38 and 39 are bowed slightly inwardly. Mounted upon the top of the standard 33 is a downwardly directed pawl or finger 40 with a curved tip 41 on the lower end thereof, the purpose of which will be explained hereinafter. Mounted upon the opposite side and on top of the frame 2 are downwardly directed screw means 42, the purpose of which will be explained hereinafter. Mounted on the standards 32 and 33 on the outsides thereof and adjacent the middle thereof, as viewed in Fig. 1, are cam elements 43, the purpose of which will be explained hereinafter. The standards 32 and 33 are provided with vertical channels down the center thereof in which the movable carriage 4 is adapted to be slidably mounted and in the back channel of which is adapted to be slidably mounted, a driving connection between the pit-locating assembly 8 and the lever 16.

Pit-locating assembly

Figures 5, 6, 7:
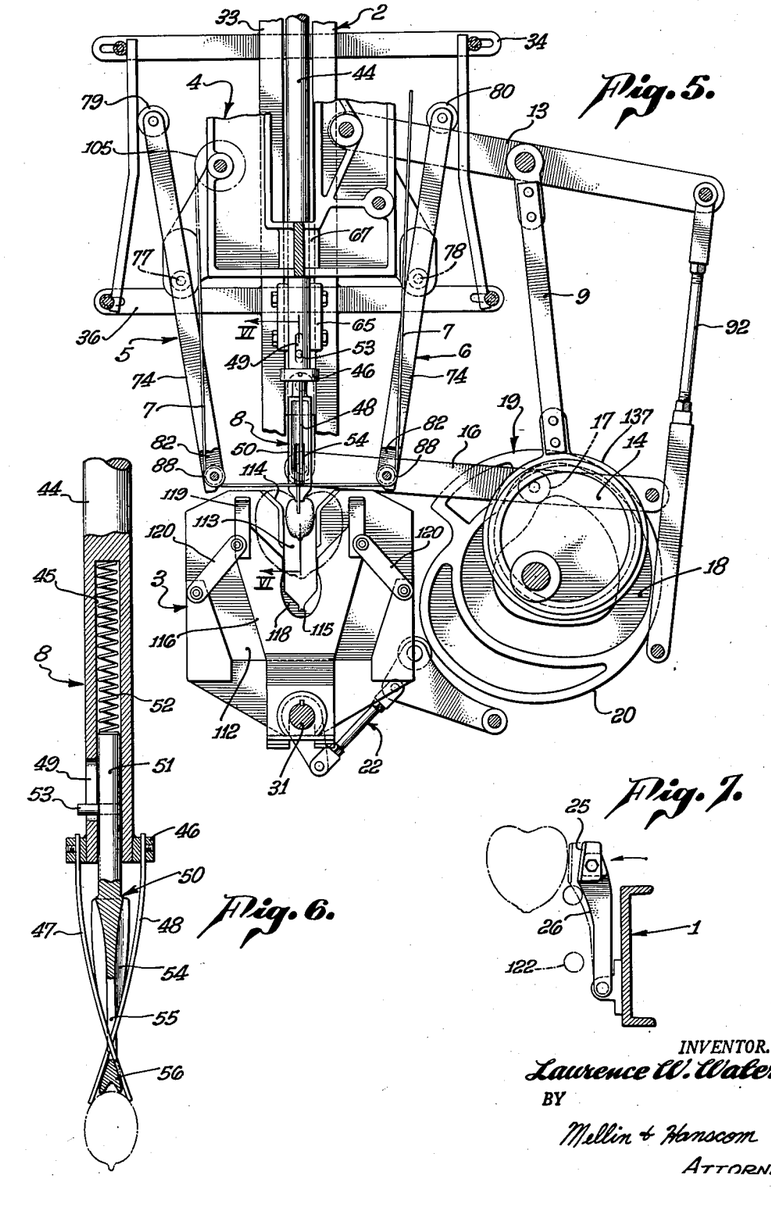
Fig. 5 is a partial side elevational sectional view showing the apparatus just prior to the severing stroke.
Fig. 6 is a sectional view taken along VI—VI of Fig. 5 illustrating the pit-locating means of this invention.
Fig. 7 is a view of the peach presser plate and actuating cam utilized in the apparatus of this invention.

The pit locating assembly, indicated generally at 8, comprises a vertically disposed rod 44, (best shown in Fig. 6) the lower end of which has a hollow recess 45 extending upwardly thereinto from the bottom thereof. Adjacent the lower end of the rod 44 a vertical slot 49 is provided in one side thereof which extends into the hollow recess 45 therein. A prong-holding element 46 is mounted upon and around the lower end of the rod 44. Said prong-holding element 46 holds the ends of two inwardly curved prongs 47 and 48. A prong-guiding element, indicated generally at 50, is provided with a longitudinal, cylindrical, upper extension 51 adapted to be inserted into the cylindrical recess 45 in the lower end of the rod 44 and to abut the lower end of a coil compression spring 52 mounted in said cylindrical recess 45. A stop pin 53 extends laterally from the upward extension 51 through the slot 49 in the side of the hollow rod 44. This stop pin acts to limit the travel of the prong-guiding element 50 with respect to the rod 44. The lower end of the prong-guiding end of the prong-guiding element 50 is provided with a fluted head 54 provided with aperture 55 adjacent the lower end thereof through which the forward free ends of the prongs 47 and 48 are adapted to be inserted in crossed relation, as best shown in Fig. 6. The fluted head 54 of the prong-guiding element 50 is provided with a pit-engaging tip 56 at the lower end thereof adapted to be placed in to forcible engagement with a pit during the downward stroke of the pit-locating assembly 8. During such downward movement of the pit locating assembly 8 the spring 52 causes the prong-guiding element 50 to be in extended relation to the rod 44 with the prongs 47 and 48 in their most retracted position. When the pit-engaging tip 56 of the fluted head 54 is placed in contact with the end of the pit, the opposite end of which is firmly seated in the fruit-holding assembly 3, the entire prong-guiding element 50 is forced upward with respect to the rod 44 against the action of the spring 52. This causes the ends of the prongs 47 and 48 to be extended with relation to the pit-engaging tip 56 of the fluted head 54 and to engage and locate each side of the pit adjacent the stem end thereof.

The upper end of the rod 44 is connected to a rearwardly extending linkage 57 which in turn is connected to a downwardly extending sliding tongue 58 which is vertically slidably mounted in the vertical channel 59 down the center of the standard 33. The lower end of the tongue 58 is connected by a linkage 60 to the driving lever 16, which, as hereinbefore mentioned, is driven by means of cam follower 17 positioned within the cam track 18 of the cam 19.

Vertically movable carriage

The vertical carriage, indicated generally at 4, is slidably mounted with respect to the frame 2, by means of spaced, vertically aligned projecting elements 61 and 62 at the top and bottom respectively of the righthand side of the movable carriage 4 which extend into the vertical channel 63 running down the center of the standard 32, and by means of oppositely disposed similarly vertically aligned spaced projections 64 and 65 extending respectively from the top and bottom of the lefthand side of the carriage 4 into the vertical channel 59 running down the center of the standard 33. Thus the entire carriage 4 may be vertically reciprocated up and down with respect to the standards 32 and 33 along the channels 63 and 59 therein.

The carriage 4 is provided with two spaced, aligned bearings 66 and 67 at the top and bottom, respectively, thereof, which are adapted to surround the rod 44 of the pit-locating assembly 8 so as to allow independent, vertical, reciprocating movement between the carriage 4 and the pit-locating assembly 8. Pivotally mounted on the rear of the carriage on each side thereof are two tension-controlling lever arms 68 and 69 which carry the take-up means indicated generally at 12 adjacent the outer free ends thereof. The structure and operation of the take-up means 12 will be described more fully hereinafter.

Referring to Fig. 1, tension springs 70 are connected to the lever arms 68 and 69 at points spaced from the outer free ends thereof, the other ends of the springs 70 being connected to pins 71 mounted on the carriage 4 on each side of and adjacent the top thereof. The purpose of springs 70 is to control the tension on the severing wires 7 during the upward stroke of the carriage 4. Coil compression springs 72 are also operatively connected to the tension arms 68 and 69. The purpose of the coil compression springs 72 is to control the tension of the severing wires 7 during the downward severing stroke of the carriage 4 and severing wires 7 so that if the severing wires 7 are being forced through an unusually hard peach or should happen to engage a portion of the pit, the wires 7 will not break but the coil compression springs 72 will be compressed slightly, thus preventing the tension of the severing wires 7 from being increased unduly to the point of breaking same.

Figure 3:
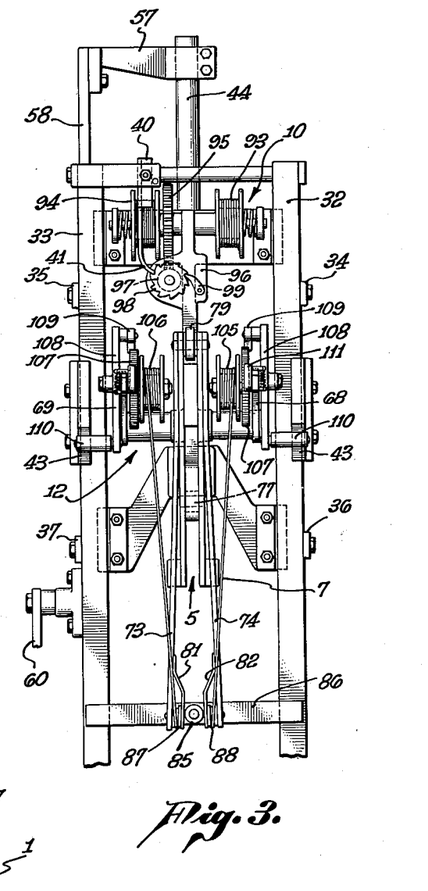
Fig. 3 is a sectional view taken along III—III of Fig. 1.

Lever arms 5 and 6 each include a left leg and right leg 73, 74 respectively. The lever arms 5 and 6 are pivotally mounted at 77 and 78 on each side of the lower corner of the movable carriage 4. The upper extensions of the lever arms 5 and 6 are provided with cam followers 79 and 80 which are adapted to engage and follow the inner surfaces of the cams or cam tracks 38 and 39 respectively mounted on the frame 2. The lower ends of the legs 73, 74 are provided with inwardly directed spring elements 81, 82 respectively. The springs on each of the opposed legs, such as springs 81 and 82 on opposed legs 73 and 74, are adapted to engage a cylindrical roller or pin 85 mounted on cross bars 86 positioned across the front and back of the standards 32 and 33 just above the severing zone. Thus, when the movable carriage 4 is in its upper position, as shown in Fig. 3, the rollers 85 acting against the opposed springs 81, 82 spread the opposed legs 73, 74 apart. Thus a sufficient opening is provided to allow the pit-locating assembly 8 to pass between the flexible severing wires 7. This is true both of the up stroke and down stroke. Positioned between each of the springs 81, 82 and the ends of the legs 73, 74 opposed thereto are rotatably mounted sheaves 87, 88 adapted to carry the spaced parallel flexible severing wires 7.

Positioned between the main body of the moving carriage 4 and the upper ends of the lever arms 5 and 6 are C springs 91 which bias the upper ends of the levers 5 and 6 outwardly about the pivot points 77 and 78, thus causing the lower ends of the arms 5 and 6 to tend to move toward each other when free to do so. This occurs during the downward severing stroke of the movable carriage 4 and lever arms 5 and 6 carried thereby when the cam followers 79 and 80 on the upper ends of the lever arms 5 and 6 move downwardly sufficiently along the cam tracks 38 and 39 to pass the point where said cam tracks 38 and 39 bend outwardly. Any further downward movement allows the C springs 91 to force the upper ends of the lever arms 5 and 6 outwardly about the pivot points 77 and 78, thus causing the lower ends of the lever arms 5 and 6 and the sheaves 87, 88 carrying the flexible severing wires 7 to be forced inwardly toward each other, thus forming loops in the flexible severing wires 7. This action takes place during passage of the flexible severing wires 7 through the peach and closely adjacent to and on each side of the pit thereof during the severing stroke. The vertically reciprocating movement of the carriage 4 is controlled as hereinbefore mentioned by means of the lever 13, connecting rod 9 and the driven eccentric 14, the outer free end of the lever 13 being connected to a pivotally mounted rod 92 of fixed length which is connected to the base 1.

*Wire feed mechanism*

Referring to Fig. 1 mounted upon the movable carriage 4 are the hereinbefore generally described wire feeding means 10 and wire snubbing means 11 which will now be described in detail. Rotatably mounted upon and on each side of the upper portion of the movable carriage 4 are two supply reels 93 and 94 adapted to have mounted thereon a supply of flexible severing wire. Operatively connected to the shaft which simultaneously rotates the reels 93 and 94 is a worm wheel 95. Positioned in a mounting bracket 96 adjacent to and in engagement with the teeth of the worm wheel 95 is a worm 97 which is operatively connected to and adapted to be driven by a ratchet 98 mounted on the outside of the bracket 96. A retaining pawl 99 is pivotally mounted on the bracket 96 adjacent to the ratchet 98 and is adapted to prevent backward rotation of the ratchet 98. When the entire movable carriage 4 moves upward to the greatest height attained thereby, which is immediately after the operation of the device is manually initiated by the operator, the top 41 of the downwardly extending finger or pawl 40 affixed to the top of the frame 2 rotates the ratchet 98 in a counterclockwise direction, as viewed in Fig. 3. This rotates the attached worm 97 which also rotates the worm wheel 95 and feed-out reels 93 and 94 driven thereby a predetermined amount, thus paying out or feeding out a pre-determined amount of severing wire. The severing wires then pass over two spaced, parallel snubbers 100 mounted on each side of the upper portion of the carriage 4. Positioned adjacent to and held in spring-biased contact with the upper surface of the snubbers 100 are two small spring-biased rollers 101 adapted to maintain the wire in contact with the periphery of the snubbers 100. Levers 102 which are pivotally mounted at the axis of each of the snubbers 100 are provided with a rearwardly extending portion having pivotally mounted thereon pinch wheels 103. Said levers 102 are provided with forward extensions adapted to abut and be pivotally moved by the downwardly extending, screw type abutting means 42 which are mounted in the top of the frame 2 when the carriage 4 moves upwardly to the highest position attained thereby, which is shortly after manual initiation of a pitting operation by the operator, or in other words, immediately subsequent to the actuation of the wire feeding means, indicated generally at 10. This actuation of the levers 102 about their pivotal connection at the center of the snubbers 100 causes the pinch wheels 103, which have been heretofore spring-biased downwardly, into firm engagement with the exterior surface of the snubbers 100 by means of spring 104, to be moved away from the snubbers 100, thus separating the pinch wheels 103 and the snubbers 100 and allowing the severing wires 7 to be pulled therebetween toward the severing zone by reason of the tension in the wires. Immediately thereafter, when the carriage 4 moves in a downward direction toward the severing zone, the forward ends of the levers 102 are no longer in engagement with the downwardly extending abutting means 42 and the springs 104 return the pinch wheels 103 into firm engagement with the snubbers 100, thus firmly locking the severing wires in position so that tension may be applied thereto during the severing stroke of the pitting operation.

*Flexible severing wire take-up mechanism*

Pivotally mounted adjacent the ends of the movable lever arms 68 and 69 carried by the movable carriage 4 are two flexible severing wire take-up means indicated generally at 12. These comprise take-up reels 105 and 106 on the right and left side respectively of carriage 4 and are adapted to wind the severing wires 7 thereupon. Each of the take-up mechanisms operates in exactly the same manner, so only the take-up mechanism shown on the right side of the carriage in Fig. 4 will be described, which includes the take-up reel 105. The take-up reel 105 is pivotally mounted with respect to the lever arm 68. Attached thereto is a ratchet wheel 107. Also pivotally mounted with respect to the arm 68 at the same point as the take-up reel 105 and ratchet 107 is an actuating lever 108, the upper end of which is provided with a pivotally mounted pawl 109 adapted to actuate the ratchet 107 in a clockwise direction, as viewed in Fig. 1. The lower end of the lever arm 108 is provided with a laterally extending cam follower 110 adapted to make contact with the cam surface of the cam 43 during the upward stroke of the carriage 4. The lower end of lever arm 108 is spring-biased toward the cam surface by a tension spring 191. An additional pivotally mounted retaining pawl 111 is mounted upon the outer end of the lever arm 68 for preventing the ratchet 107 from rotating backwardly. Both of the pawls 109 and 111 are spring biased toward ratchet-engaging position, as is usual.

The operation of this take-up is as follows. During the upward stroke of the movable carriage 4, if the tension on the flexible severing wires 7 is beyond a predetermined minimum value, the coil tension springs 70 will be somewhat extended and the lever arms 68 and 69 will be pivoted about their pivotal connection point to the carriage 4 in a downward or counter-clockwise direction as viewed in Fig. 1. Thus the cams 110 will not come into contact with the cam surfaces of the cam elements 43 fixed on the frame 2 and no rotation of the ratchet wheels and take-up magazines will occur. However, if the tension of the severing wires 7 is below the predetermined minimum, the tension springs 70 will cause the lever arms 68 and 69 to be positioned somewhat higher or more upwardly directed with respect to the movable carriage 4, and in this case the cams 110 will come into contact with the angularly directed cam surfaces of the cams 43 and cause rotation of the levers 108, ratchets and take-up reels, thus taking up the flexible severing wires.

*Fruit holding or incisor assembly*

The incisor assembly 3, which is pivotally mounted on the horizontal shaft 31 rotatably mounted between standards 32 and 33 at the base thereof, comprises a central incisor blade 112 provided with a forwardly directed pit-receiving recess 113 therein. The edges of the incisor on each side of the recess 113 adjacent the forward end thereof are sharpened as indicated at 114 for incising and impaling a peach. The rear portion of the recess 113 is provided with a small notch 115 at the bottom thereof, adapted to receive the tip of a pit therein. Mounted on each side of and in contact with the central incisor blade 112 are two guide plates 116 which are forwardly recessed also. The forward portion of the guide plates 116 do not extend nearly as far forward as the central incisor blade 112 since they are intended to act as incisors. The recesses in the guide plates 116 are curved in a roughly oval form spaced from the edge of the central incisor blade 112 forming the recess as indicated at 118. The forward ends of the guide plates 116 are provided with curved wire guiding tips 119 adapted to guide each of the flexible severing wires into positions on each side of the central incisor blade 112 and between said central incisor blade 112 and the guide plates 116 on each side thereof. Linkages 120 are mounted adjacent the outer edges of the central incisor blade 112 with the other ends thereof provided with inwardly directed spring-biased elements 121 for forcing the ends of the guide plates 116 on each side of the central incisor blade 112 into spring-pressed contact therewith. Mounted adjacent the lower corner of one side of the central incisor blade 112 is the roller 122 adapted to cooperate with the cam 26 of the peach presser plate 25 for actuating said peach presser plate, as hereinbefore described.

The operation of the incisor assembly 3 may be described as follows. As hereinbefore mentioned, after the peach is manually impaled by the operator on the sharpened edges 114 of the central incisor blade 112 with the tip of the peach pointed down and the suture or seam thereof along the side aligned with the sharpened edges thereof, then safety handle 23 is actuated, followed by operating handle 24 which causes the entire incisor assembly 3 to be rotatably moved from the angularly directed, fruit-loading position shown in Figs. 1 and 4 into the fruit-severing position shown in Fig. 5 by means of the cam follower 21 engaging the outer cam surface 20 of the driven cam 19 which through linkage 22 pivots the entire incisor assembly about the shaft 31. Then the hereinbefore-mentioned slight upward movement of the carriage 4 occurs in response to rotation of the eccentric 14, which, as hereinbefore explained, causes the wire feed and snubbing mechanism indicated at 10 and 11 to feed or advance the flexible severing wires 7 toward the severing zone and which also causes the flexible wire take-up means indicated generally at 12 to take up said wires provided the tension thereof is below a predetermined value, as hereinbefore described. Then the pit-locating center 8 is rapidly driven in a downward direction by means of the lever 16 and cam follower 17 in the cam track 18 of the driven cam 19. The pit-locating center passes between the two parallel flexible severing wires which are relatively widely separated because the rollers 85 are in contact with the opposed springs 81, 82 on opposed legs 73, 74 of the lever arms 5 and 6. The pit-locating center continues its downward travel until the pit-engaging tip 56 thereof comes into firm engagement with the upper or stem end of the pit of the peach, while the lower end or tip thereof is firmly rested against the bottom of the recess 113 in the central incisor blade 112 with the tip of the pit fitted in the notch 115 in the bottom of said recess. Then, as hereinbefore mentioned, spring-biased prong-guiding element 58 of the pit-locating center 8 moves upward against the action of the coil compression spring 52, thus causing the prongs 47 and 48 to be extended and to locate and grip the pit of the peach on each side thereof. Then the movable carriage 4 and lever arms 5 and 6 carrying the flexible severing wires 7 move down and out of engagement with the rollers 85, thus causing the severing wires 7 to approach each other until the springs 81, 82 on the arms 73, 74 of the lever arms 5 and 6 slidably engage the central incisor blade 112 on each side thereof. The movable carriage 4 and the lever arms 5 and 6 carrying the flexible severing wires 7 continue their downward movement on each side of the central incisor blade and the flexible severing wires 7 come into contact with the curved guide tips 119 and are guided into positions between the lateral guide plates 116 and the central incisor blade 112 on each side thereof. The flexible severing wires at this time are on each side of the fluted head 54 of the pit-locating assembly 8 and, are guided along the prongs 47 and 48 thereof on each side of the pit engaged therebetween as they start to pass through the peach. The edges of the lateral guide plates 116 hold the flexible severing wires 7 close together adjacent the edges of the pit. At this time the lower ends of the lever arms 5 and 6 are pivoted inwardly by reason of the cam followers 79 and 80 at the upper ends thereof moving outward along the lower portions of the cam tracks 38 and 39. Thus a backwardly directed loop is formed in each of the flexible severing wires which are spaced from each other. This allows the flexible severing wires to pass through the peach on each side of the pit therein and closely adjacent thereto and yet have sufficient freedom as not to end to tear off the minute projections on the sides of the pit. This results in a very clean, close severing of the halves of the peach closely adjacent to the pit.

During the period just described, the peach presser plate 25 has been firmly holding one half of the severed peach, the other half thereof being allowed to fall down below the machine on to a conveyor belt or the like. During the upward stroke of the movable carriage 4, as the flexible severing wires 7 are passed back through the incisor assembly 3 in the same path they followed on the downward stroke, they engage the pit of the peach and eject same from the machine. Next the entire incisor assembly 3 is rotated about its driving connection back to fruit-loading position which also acts to disengage te peach presser plate 25 from the peach, thus allowing the remaining half of the peach to fall down below the machine on to the moving conveyor belt or the like.

*Drive*

The interlocking drive comprises a driven shaft 123 which may be connected to a reduction gearing, not shown, driven in turn by a suitable motor, such as an electric motor or the like, also not shown. Attached to the shaft 123 is a clutch driving element 124 provided with a notched periphery 125. Spaced immediately adjacent to and concentric with the driving clutch element 124, is a rotatable plate 126 comprising the driven clutch element upon which a pawl 127 is pivotally mounted at 128. The upper end of the pawl is provided with a tension spring 129 affixed thereto and connected to the plate 126 and adapted to spring bias the pawl in a clockwise direction, as viewed in Fig. 1, so as to maintain a tooth 130 on the inner surface of the pawl in engagement with the notched periphery 125 of the driving clutch element 124. Adjacent the pivot point 128 of the pawl 127 is a projection 131 which is adapted to be engaged by pivotally mounted latch lever 132 connected by the connecting rod 133 to spring-biased actuating handle 24. Mounted upon the plate 126 is a radially projecting pin 134 which is adjacent the lower end of the pawl 127 and is adapted to be contacted thereby when the pawl 127 is rotated about its pivot point 128 in a counter-clockwise direction against action of the tension spring 129 when the tooth 130 is disengaged from the notched periphery 125 of the driving clutch element 124. Concentric with the pivotal mounting 128 of the pawl 127 is a laterally projecting pin, the purpose of which will be explained hereinafter. Mounted closely adjacent the rotatable driven clutch element 126 and to the front thereof, as viewed in Fig. 1, is an upwardly directed flat-topped pin or bolt 135 which is pivotally mounted adjacent the lower end thereof and which is spring-biased and retained in a virtually upright position by means of tension spring 136.

The operation of the clutch may be described as follows. When the actuating handle 24 is depressed, the latch lever 132 is pivoted about its pivot point in a counterclockwise direction, as viewed in Fig. 1, thus releasing the connection between the latch lever 132 and the projection 131 on the pawl 127. This allows tension spring 129 to cause the pawl 127 to pivot about its pivot point 128 in a clockwise direction so as to engage the tooth 130 in the notched periphery 125 of the driving clutch element 124. Thus the driving clutch element 124 and the driven clutch element 126 are in engagement and positive power transmission takes place for one revolution. When the pawl 127 has been rotated through one complete clockwise revolution and the transversely extending pin 128 abuts the side of the upwardly extending support pin 135, said support pin 135 is deflected against the action of the tension spring 136 to allow the transversely extending pin 128 to pass thereby. At the same time the projection 131 comes into contact with the latch lever 132 which has been returned to its original position since the operator releases the actuating handle subsequent to initiation. This causes the pawl 127 to pivot about the pivot point 128 against the action of the tension spring 129 so as to disengage the tooth 130 from the notched periphery 125 of the driving clutch element 124. Thus the driving clutch element 124 and the driven clutch element 126 are disengaged and the lower end of the pawl 127 has come into contact with the transversely extending stop pin 134 of the driven clutch element 126, with the transversely extending pin 128 extending from the pawl 127 resting on the top end of the spring-biased supporting pin 135. The apparatus is maintained in this position until the operator manually depresses the operating handle 24 again, at which time the entire cycle of operations just described is again repeated. The driven clutch element 126 is connected to and drives the eccentric 14 and cam 19. The eccentric 14 is provided with a ring 137 slidably mounted therearound constituting the driving connection to the connecting rod 9.

Figures 8, 9:
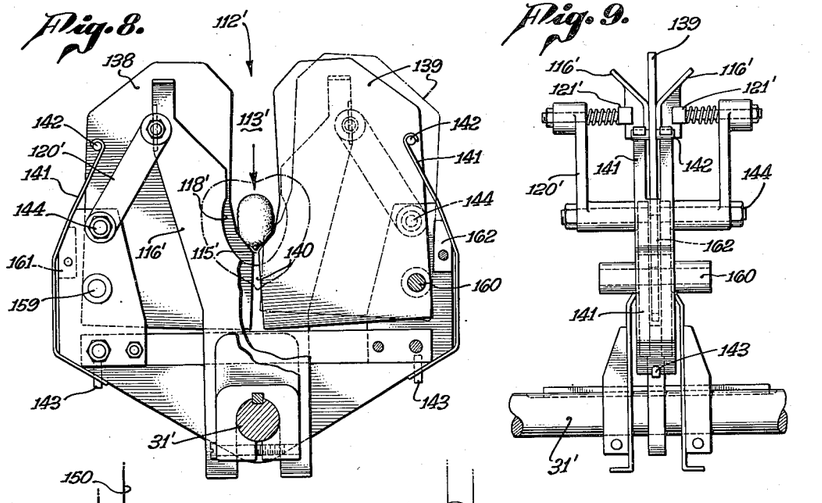
Fig. 8 is a view of an alternate fruit holding assembly.
Fig. 9 is a side view of Fig. 8.

A modified form of fruit holder or incisor is illustrated diagrammatically in broken-away form in Figs. 8 and 9. This modified incisor is very similar to the previously described incisor. However, in this incisor the central incisor blade comprises two separated portions 138 and 139 which correspond to the previously described single incisor blade 112. These portions 138 and 139 of the central incisor blade, indicated generally at 112', are separated right down the center of the recess 113' as indicated at 140 and are an extension of the notch 115' similar to the notch 115 in the first form of incisor, this being adapted to receive the tip of a pit mounted in the recess 113. The two lateral portions 138 and 139 of the central incisor blade 112' are pivotally mounted on the shaft 31' in a manner similar to that hereinbefore described. The two portions 138 and 139 of the central incisor blade 112' are normally spring-biased outwardly with respect to each other against stops 161 and 162 into a relatively open position shown in dashed lines by means of springs 141 which are connected by means of posts 142 to the portions 138 and 139 of the central incisor blade 112' adjacent their upper, outer ends, the other ends of said springs being attached to posts 143 operatively fixed to the lateral guide plates 116'. It should be noted that the linkages 120' carrying spring-biased elements 121' adapted to force the upper ends of the lateral guide plates 116' into close contact with the central incisor blade 112' are mounted upon posts 144 which do not extend clear through the incisor assembly. This is so that the portions 138 and 139 of the central incisor blade 112' freely rotate about pivot points 159 and 160 with respect to each other and with respect to the guide plates 116' on each side thereof.

The operation of this incisor is very similar to that hereinbefore described, the peach being manually impaled in the same manner upon the central incisor blade when in the position shown in dashed lines. When the pit-locating assembly 8 descends and force is applied to the upper end of the pit, the lower end thereof engages the portions 138 and 139 of the central incisor blade 112' in the lower end of the recess 113', thus causing the portions 138 and 139 to rotate toward each other against the action of the springs 141. This causes the opposed edges of the portions 138 and 139 of the central incisor blade 112' adjacent the bottom of the recess 113' to come together along each edge of the pit therein and to grip same firmly along the edges. Thus a positive engagement of the pit occurs. This incisor assembly has the further advantage of compensating for pits of various sizes.

Figure 10:
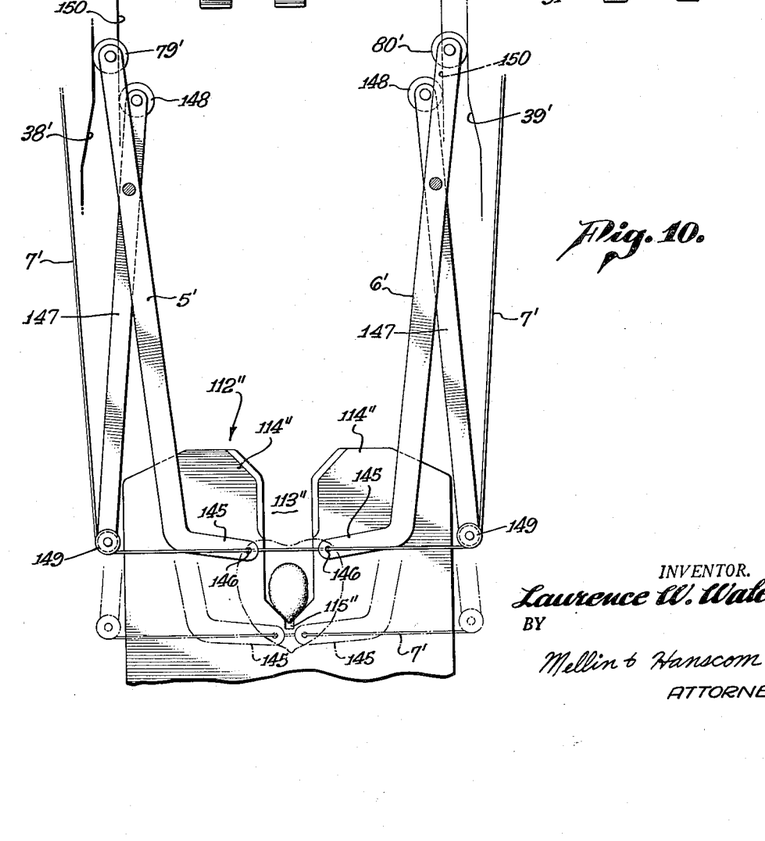
Fig. 10 is a skeletonized diagrammatic view of another alternate fruit holder and severing wire guide assembly.

Fig. 10 illustrates diagrammatically another modified fruit holder arrangement. In this version, a central incisor blade 112" is provided with a forwardly directed pit-receiving recess 113' having edge portions 114" and a fruit pit tip-receiving notch 115" at the bottom thereof. This central incisor blade is similar to the first form of incisor assembly hereinbefore described. The lever arms 5' and 6' are carried by the movable carriage, not shown. The cam tracks 38' and 39' which are adapted to be carried by the frame and are shown broken away, are somewhat different from that shown in the first form of the invention. In the first place, the contour of the cam tracks 38' and 39' is slightly different as shown in the figure. The lower ends of the lever arms 5' and 6' are also different in that inwardly directed sharp-edged guides 145 are provided, the ends of said guides 145 having holes 146 therein. It should be noted that these guides 145 perform the same function as the stationary guide plates 116 of the incisor assembly in the first form of this invention. During the downward stroke of the movable carriage carrying the lever arms 5' and 6', the flexible severing wires which pass through the apertures 146 in the sharp-edged guides 145 and the guides 145 all move through the severing stroke together closely adjacent to and on each side of the central incisor blade 112". The holes 146 in the sharp-edged guides 145 are caused to follow a roughly oval contour corresponding to the edges of the lateral guide plates 116 in the first form of this invention by means of cam followers 79' and 80' at their upper ends following the contours of the cam tracks 38' and 39'. Thus the flexible severing wires are guided through the peach closely adjacent to the edges of the pit therein in a manner similar to the hereinbefore described severing operation. In the embodiment illustrated additional lever arms 147 provided with cam followers 148 at the upper ends thereof and grooved sheaves 149 at the lower ends thereof and pivotally mounted on the movable carriage are also shown. They are shown following straight line cam tracks 150. The purpose of this is to cause the flexible severing wires 7' to be maintained rigidly through their downward stroke. The flexible severing wires 7' are adapted to first pass over the grooved sheaves 149 and then through the holes 146 in the sharpened guides 145. When the apparatus operates in this manner, the hereinbefore described backwardly curved flexible loop is not formed in each of the severing wires 7' and a relatively straight line loop is formed on each side of the pit during the severing operation. The lever arms 147, cam followers 148 and grooved sheaves 149 may be dispensed with entirely, if it is desired that the upwardly directed flexible loop be formed in each of the flexible severing wires 7' during the severing stroke.

Modified form of take-up mechanism

Figure 11:
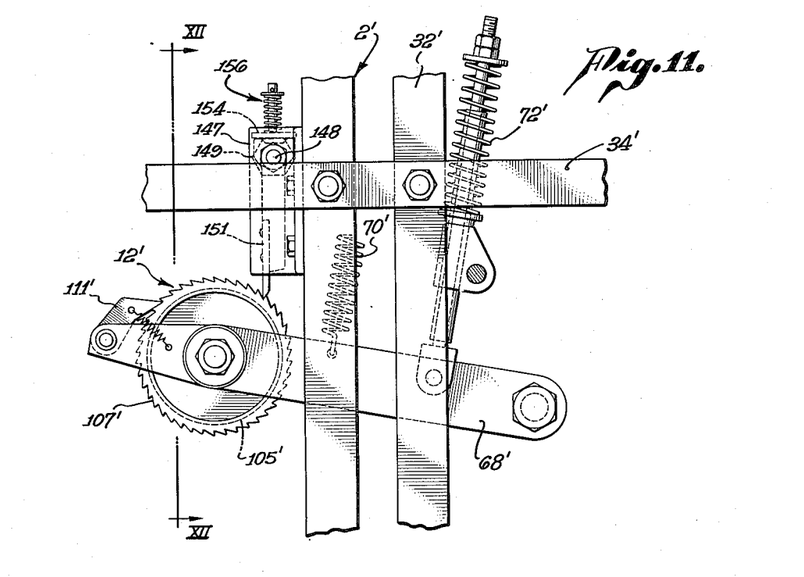
Fig. 11 is a fragmentary side elevational view of a modified flexible wire take-up.
Figures 12, 13:
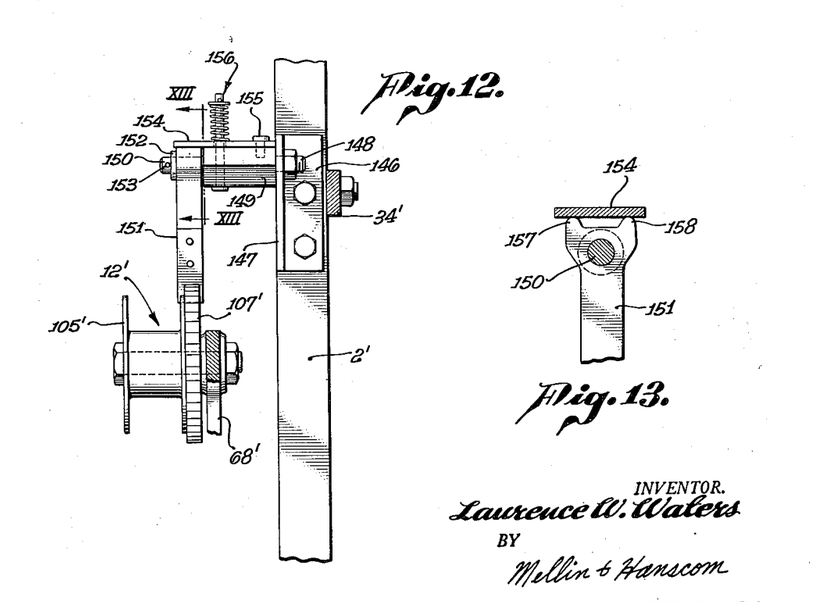
Fig. 12 is a fragmentary front elevational view of the modified take-up shown in Fig. 11 taken along line XII—XII of Fig. 11.
Fig. 13 is a fragmentary sectional view taken along XIII—XIII of Fig. 12.

The modified form of flexible severing wire take-up mechanism, indicated generally at 12', is shown in fragmentary form in Figs. 11, 12 and 13. Fig. 11 is a side elevational view viewed in the same direction as the flexible severing wire take-up 12 in Fig. 1; Fig. 12 is a front elevational view of the modified take-up 12' viewed in the same direction as the first form of take-up mechanism 12 in Fig. 3; and Fig. 13 is a fragmentary sectional view of the actuating pawl of the take-up apparatus.

The modified form of flexible severing wire take-up mechanism shown in Figs. 11, 12 and 13 is quite similar to the first form of take-up mechanism hereinbefore illustrated and described.

Arm 68' and arm 69' (not shown) are pivotally mounted on the movable carriage 4 of the first embodiment of the invention and not shown here. Two ratchet wheels are again pivotally mounted adjacent the outer ends of the arms 68' and 69' and positioned on each side of the central movable carriage 4. In Figs. 11 and 12 only lever arm 68' and ratchet wheel 107' are shown, the lever arm 69' and associated take-up mechanism carried thereby being deleted for reasons of clarity. Mounted upon the outer end of the pivotally mounted lever arm 68' is an inwardly spring-biased retaining pawl 111' similar to that shown in the first form of this invention. The lever arm 68' is upwardly spring-biased by means of tension spring 70' and is also provided with the coil compression spring 72' as in the first embodiment of this invention.

So far, the second embodiment of the take-up 12' has been the same as the first embodiment of this invention. However, the pawl for actuating the ratchet wheel 107' is different in the second embodiment of the invention from that shown previously. Mounted upon the frame 2' is a bracket 146 provided with a lip 147. Connected to the lip 147 by suitable bolt means 148 is a hexagonal member 149, the opposite end of said hexagonal member 149 being provided with a stud 150 upon which is pivotally mounted a downwardly extending pawl 151. The pawl 151 is retained upon the stud 150 by a collar 152 and retaining pin 153. A flat leaf member 154 is positioned on top of the hexagonal member 149 and retained thereon by means of a pin 155. A spring-biased element, indicated generally at 156, acts to retain the flat leaf member 154 in firm, spring-biased contact with the upper surface of the hexagonal member 149. The upper end of the pawl member 151 is provided with two upwardly extending projections 157 and 158, both adapted to normally make contact with the under surface of the flat leaf member 154, as best shown in Fig. 13.

The operation of the device may be described as follows: When the carriage moves upwardly with respect to the downwardly extending pawl 151, the tip thereof engages the teeth of the ratchet wheel 107' provided that the tension of the flexible severing wire is low enough to allow the lever arm 68' to be in the position shown in the drawings. This rotates the ratchet wheel in a clockwise direction, as viewed in Fig. 11. The retaining pawl 111' acts to prevent the ratchet wheel 107' from reverse rotation. The ratchet wheel 107' moves in an arc about the point of pivotal attachment of the lever arm 68' to the carriage, thus making it necessary that the tip of the pawl 151 be free for slight lateral movement. This is accomplished by reason of the pawl 151 being pivoted on the stud 150 and normally spring-biased by means of the spring-biased means 156 pressed on the flat leaf-like member 154, into a vertical position. However, said pawl 151 may be deflected laterally against the action of the spring-biasing means 156 during ratchet-engaging movement. Upon subsequent disengagement of the pawl from the ratchet wheel 107', said pawl returns to its normal spring-biased vertical position. Flexible severing wire magazine 105' is pivotally mounted in alignment with and adapted to be driven by the ratchet wheel 107'.

It is understood, of course, that a similar arrangement controls the other take-up mechanism positioned on the opposite side of the movable carriage.

Numerous modifications of this invention are possible and are intended to be comprehended and included herein. The examples described and illustrated are exemplary only and are not intended to limit the scope of this invention, which is to be interpreted in the light of the appended claims only.

I claim:

1. Apparatus for pitting peaches and the like, comprising a frame, wire-supporting means supported upon said frame for reciprocal movement to and from a pitting station, fruit pitting wires supported thereby, a fruit holding element adapted to impale a peach and supported by said frame for oscillatory, pivotal movement to and away from said pitting station, means for reciprocating said wire-supporting means, means for oscillating said fruit holding element and means for actuating said reciprocating and oscillating means in timed relationship to present an impaled fruit at said pitting station for pitting by said wires, said actuating means comprising a drive shaft, first and second eccentric members secured thereto and linkages interconnecting said eccentric members with said wire-supporting means and said fruit holding element, respectively.

2. Apparatus for pitting peaches and the like, comprising a frame, a wire-supporting element supported upon said frame for reciprocal movement to and from a fruit pitting station, fruit pitting wires supported thereby, a pit locating element supported for reciprocal movement relatively to said wire-supporting element to and away from said pitting station, a fruit holding element adapted to impale a peach and supported by said frame for oscillatory, pivotal movement to and away from said pitting station, means for reciprocating said wire-supporting element, means for reciprocating said pit locating element, means for oscillating said fruit holding element and means for actuating said reciprocating and oscillating means in timed relationship to pivot said fruit holding element to said pitting station, then move said pit locating element to said station, then move said wire-supporting means to said station and then restore said elements to their rest positions removed from said station, said actuating means comprising a drive shaft, first, second and third eccentric members secured thereto and means interconnecting said eccentric members with said wire-supporting, fruit holding and pit locating elements, respectively.

3. Apparatus for pitting peaches and the like, comprising a frame, a wire-supporting element supported upon said frame for reciprocal movement to and from a fruit pitting station, fruit pitting wires supported thereby, a pit locating element supported for reciprocal movement relatively to said wire-supporting element to and away from said pitting station, a fruit holding element adapted to impale a peach and supported by said frame for oscillatory, pivotal movement to and away from said pitting station, means for reciprocating said wire-supporting element, means for reciprocating said pit locating element, means for oscillating said fruit holding element, and means for actuating said reciprocating and oscillating means in timed relationship to pivot said fruit holding element to said pitting station, then move said pit locating element to said station, then move said wire-supporting means to said station and then restore said elements to their rest positions removed from said station, said actuating means comprising a drive shaft, an eccentric secured thereto, link and lever means interconnecting said eccentric to said wire supporting means, a cam secured to said shaft and having two cam tracks, and cam follower and link means for each of said fruit holding and pit locating elements interconnecting the same with one of said cam tracks.

4. A fruit holder and flexible severing wire adapted for use in a drupaceous fruit pitting machine of the type wherein flexible wires under tension are drawn through the fruit on each side of the pit for separating the fruit from the pit, comprising: a central incisor blade having two opposed pivotally mounted portions including a forward pit engaging recess therebetween; and two laterally-spaced, forwardly recessed guide plates mounted on each side of the central incisor blade for guiding the severing wires through a fruit closely adjacent to and on each side of the pit thereof for halving and severing the fruit from the pit, means for normally biasing the free ends of said opposed portions of the central incisor blade away from each other into open position, and means for forcing a pit against the walls of said recess to pivot the free ends of said blades inwardly to thus firmly hold the pit between opposed portions of the central incisor blades.

5. A fruit holder and flexible severing wire guide adapted for use in a drupaceous pitting machine of the type wherein flexible wires under tension are drawn through the fruit on each side of the pit for separating the fruit from the pit, comprising: a central incisor blade, two laterally-spaced, forwardly-recessed guide plates mounted on each side of the central incisor blade for guiding the severing wires through a fruit closely adjacent to and on each side of the pit therefore for halving the fruit and severing the fruit from the pit, said central incisor blade having two opposed portions including a forward pit-engaging recess and being pivotally mounted with respect to each other and with respect to the guide plates, means for normally spring biasing the free ends of said opposed portions of the central incisor blade away from each other into open position, means for forcing a pit into said pit-engaging recess, and means responsive to engagement of a pit with the walls of said recess to pivot said central incisor blade portions to thus firmly hold the pit between the opposed portions of the central incisor blades.

LAURENCE W. WATERS.

REFERENCES CITED

The following references are of record in the file of this patent:

UNITED STATES PATENTS

| Number | Name | Date |
| --- | --- | --- |
| 1,334,162 | Moltzner | Mar. 16, 1920 |
| 1,432,282 | Elliott | Oct. 17, 1922 |
| 1,455,323 | Cummins | May 15, 1923 |
| 1,786,724 | Wilcox | Dec. 30, 1930 |
| 1,876,492 | Frova | Sept. 6, 1932 |
| 1,921,276 | Wilcox | Aug. 8, 1933 |
| 2,317,669 | Chekian | Apr. 27, 1943 |